United States Patent [19]

Coers

[11] Patent Number: 5,395,287
[45] Date of Patent: Mar. 7, 1995

[54] MULTI-PROFILE TRANSITION ELEMENT

[75] Inventor: Bruce A. Coers, Hillsdale, Ill.

[73] Assignee: Deere & Company, Moline, Ill.

[21] Appl. No.: 59,556

[22] Filed: May 10, 1993

[51] Int. Cl.⁶ ............................................. A01F 12/00
[52] U.S. Cl. .................................... 460/113; 460/109
[58] Field of Search ............... 460/108, 113, 109, 120, 460/75, 76

[56] References Cited

U.S. PATENT DOCUMENTS

| | | |
|---|---|---|
| 2,234,078 | 3/1941 | Hunt . |
| 3,215,145 | 11/1965 | Żmuda . |
| 3,771,530 | 11/1973 | Wassell . |
| 4,312,365 | 1/1982 | Claas et al. . |
| 4,312,366 | 1/1982 | De Busscher et al. . |
| 4,446,875 | 5/1984 | Deleu . |
| 4,802,496 | 2/1989 | Bennett . |
| 5,190,497 | 3/1993 | Heidjann ............................. 460/76 |

FOREIGN PATENT DOCUMENTS

| | | |
|---|---|---|
| 1479557 | 5/1967 | France . |
| 2157304 | 1/1973 | France . |
| 4023720 | 3/1992 | Germany . |
| 479781 | 4/1954 | Italy ..................................... 460/76 |
| 897337 | 5/1962 | United Kingdom . |
| WO91/00001 | 10/1991 | WIPO . |

*Primary Examiner*—Terry Lee Melius

[57] ABSTRACT

A camming member is used to adjust two beater grates. The camming member has two circular camming discs. The first camming disc engages an oval aperture on the first beater grate. The second camming disc engages a U-shaped slot on the second beater grate. An intermediate transition grate is located between the two grates and is bolted to the camming member. The transition grate has a radial aggressive profile and a tangential less aggressive profile. By rotating the camming member the beater grates are moved up and down and the profile of the transition grate is changed.

17 Claims, 3 Drawing Sheets

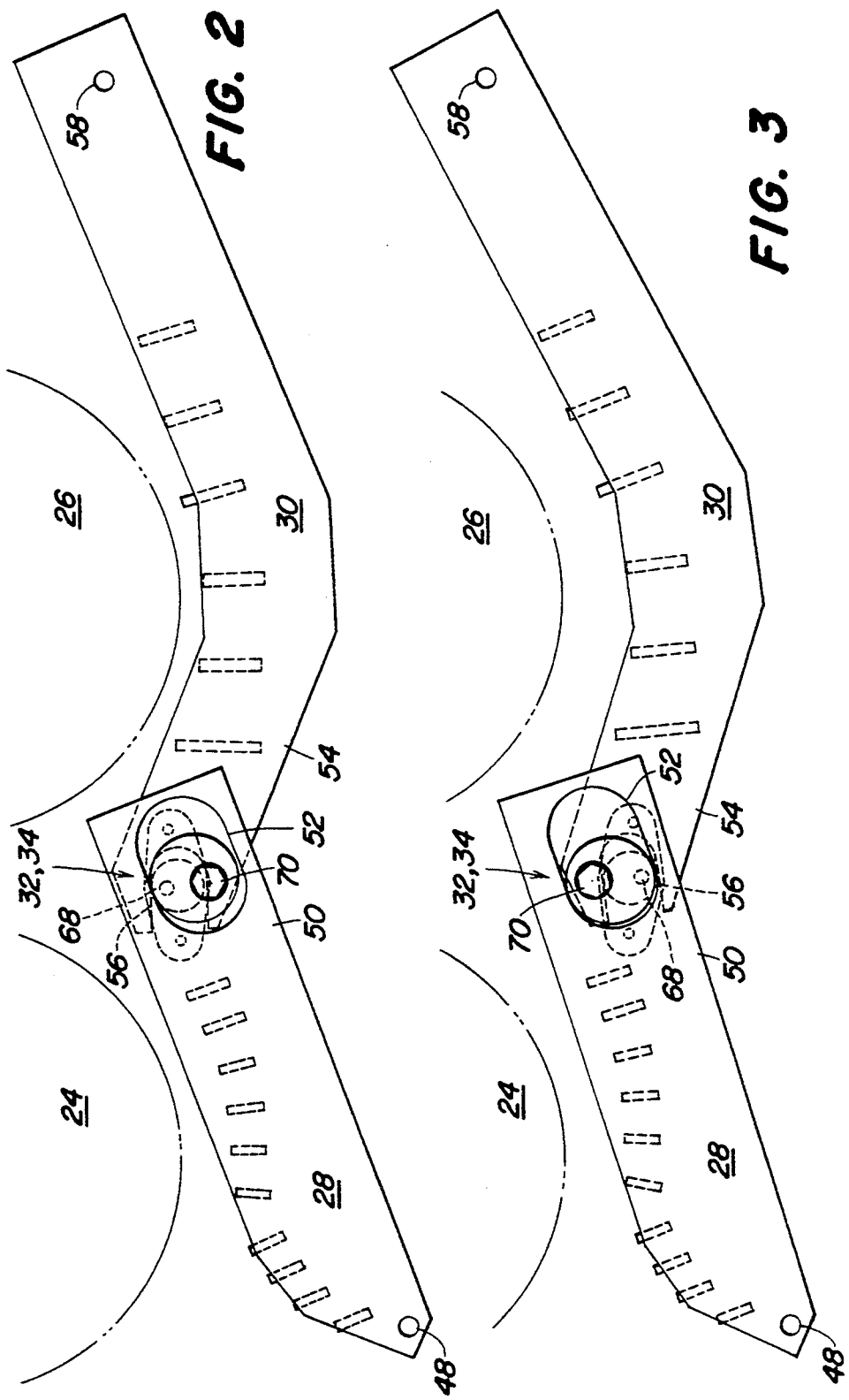

MULTI-PROFILE TRANSITION ELEMENT

BACKGROUND OF THE INVENTION

1. Field of the Invention

The invention is directed to an adjustment assembly for adjusting the relationship of two beater grates and an intermediate transition grate relative to two beaters in a agricultural combine.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Crop material is harvested by a harvesting platform located at the front of the combine. The harvested crop material is directed through a feederhouse to threshing, separating and cleaning systems. In a conventional combine, the threshing system is provided with a transverse threshing cylinder and concave. The threshing cylinder and concave direct the material to one or more beaters that maybe provided with their own grates. The beaters direct the threshed crop material to the straw walkers. The straw walkers further separate grain from the threshed crop material. Grain and chaff from the threshing system and the separating system are directed to a cleaning system which removes the chaff from the grain.

Combines having two beaters and associated beater grates located downstream of a transverse threshing cylinder are disclosed in U.S. Pat. Nos. 4,312,366 and 4,446,875. It is also known to adjust the spacing between a threshing cylinder and the concave as disclosed in U.S. Pat. Nos. 3,771,530 and 4,802,496. Mounting a beater grate to a threshing concave is disclosed in U.S. Pat. No. 3,215,145. Adjusting grates of beaters is disclosed in U.S. Pat. No. 4,312,365.

SUMMARY

It is an object of the present invention to provide a simple adjustment assembly for adjusting the profile of two beater grates relative to their associated beaters.

It is a feature of the present invention that a intermediate transition grate is located between the two beater grates and is mounted to a camming member for adjusting the relative position of the beater grates to the beaters.

It is another feature of the present invention that the intermediate transition grate has a radial more aggressive profile and a tangential less aggressive profile.

First and second beaters are located immediately behind the threshing cylinder and concave. A first beater grate is located below the first beater, and a second beater grate is located beneath the second beater. An intermediate transition grate is located between the beater grates. The first axial end of the first beater grate is pivotally coupled to the concave. The second axial end of the second beater grate is pivotally coupled to the supporting structure of the combine.

An adjustment means adjusts the positions of the beater grates and the intermediate transition grate relative to the beaters. The adjustment means comprises a camming member. The camming member has a first camming disc and a second camming disc. The first camming disc engages an oval aperture formed in the second axial end of the first beater grate. The second camming disc engages a U-shaped slot formed in the first axial end of the second beater grate.

The intermediate transition grate is bolted to a mounting plate on the camming member. This grate has two profiles that can be rotated into engagement with the crop material passing beneath the beaters. A locking bolt is bolted to the camming member when the assembly is locked into one of its two positions.

BRIEF DESCRIPTION OF THE DRAWINGS

FIG. 2 is a side view of the beater grates in their upper position.

FIG. 3 is a side view of the beater grates in their lower position.

DETAILED DESCRIPTION

Figure 1:
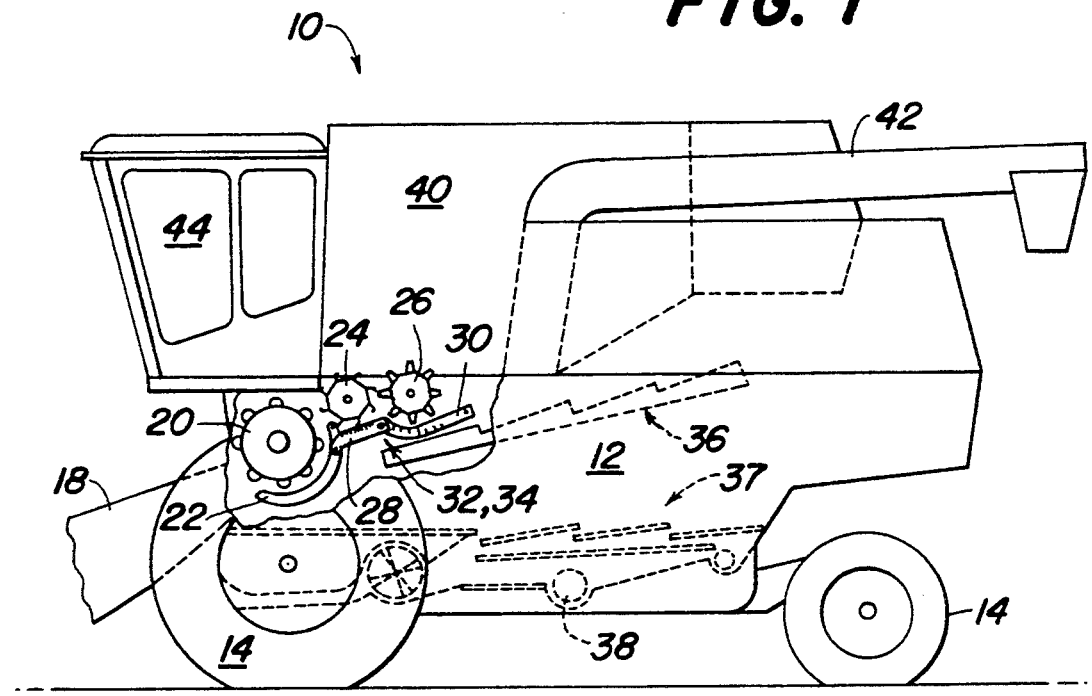
FIG. 1 is a semi-schematic side view of a combine.

The agricultural combine 10, illustrated in FIG. 1, comprises a supporting structure 12 and ground engaging means or wheels 14 extending from the supporting structure for transporting the combine across a field. The combine 10 is provided with a harvesting platform, not shown, for harvesting a crop and directing the harvested crop material to a feederhouse 18. The feederhouse 18 directs the harvested crop material to a threshing cylinder 20 and threshing concave 22 for threshing the harvested crop material. From the threshing cylinder 20 the threshed crop material is directed to a first beater 24 and a second beater 26. The first beater 24 is provided with a first beater grate 28, and the second beater 26 is provided with a second beater grate 30. An intermediate transition grate 32 and an adjustment means 34 are located between the beater grates 28 and 30. The adjustment means 34 adjusts the relative position of the beater grates 28 and 30, and intermediate transition grate 32 relative to the beaters 24 and 26.

From the first and second beaters 24 and 26, the threshed crop material is directed to a separating system 36 comprising straw walkers, which further separate grain from the threshed crop material. Grain and chaff falling from the threshing system 20-34 and the separating system 36 is directed to cleaning system 37. The cleaning system 37 removes the chaff from the clean grain. The clean grain is directed to a clean grain cross auger 38 which directs the grain to a clean grain elevator, not shown. The elevator lifts the clean grain to grain tank 40 where it is temporarily stored. The clean grain can be expelled from the grain tank 40 by an unloading auger 42. The operation of the combine is controlled from operator's cab 44.

Figure 4:
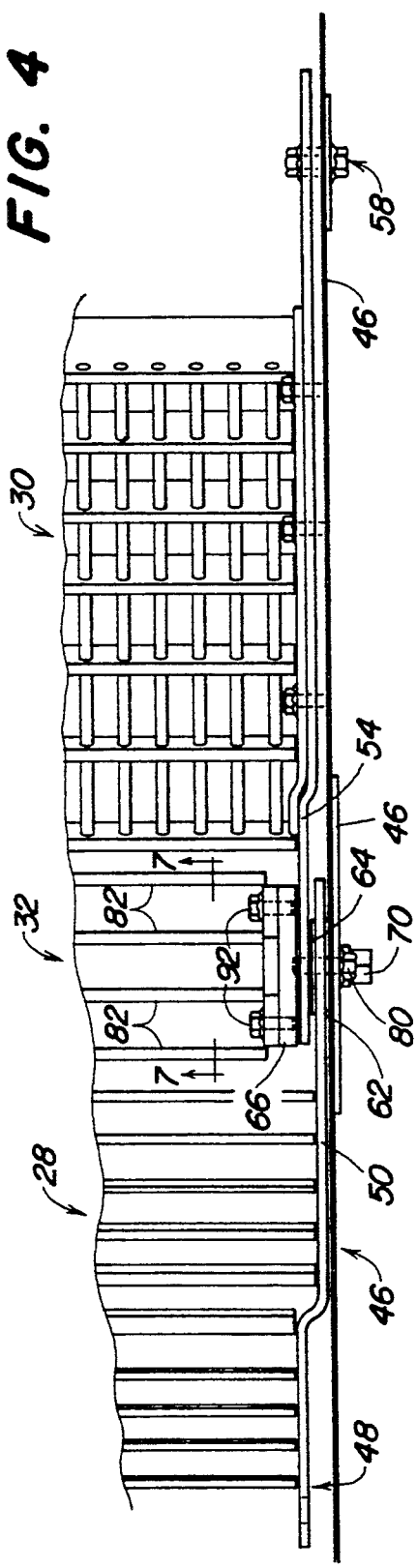
FIG. 4 is a partial top view of the beater grates, the intermediate transition grate and the adjustment means.

The present invention is directed to the adjustment means 34 for beater grates 28 and 30, best illustrated in FIGS. 2–4. The beater grates are located between the sidesheets 46 of the combine. The sidesheets are part of the supporting structure 12.

The first beater grate 28 has a first axial end that is pivotally coupled to the concave at 48. The second axial end of the first beater grate 28 is provided with a rail 50 having an oval aperture 52 for engaging the adjustment means 34. The first axial end of the second beater grate 30 is provided with a rail 54 having a U-shaped slot 56 for engaging adjustment means 34. The second axial end of the second beater grate 30 is pivotally coupled to the sidesheets 46 at 58. It should be noted that the intermediate transition grate is not shown in FIGS. 2 and 3 for clarity.

Figure 6:
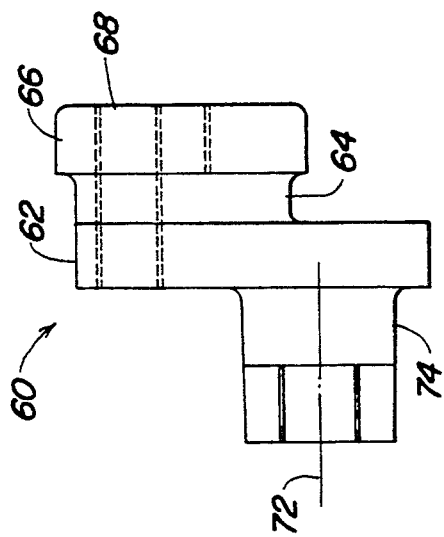
FIG. 6 is an end view of the camming member.
Figure 5:
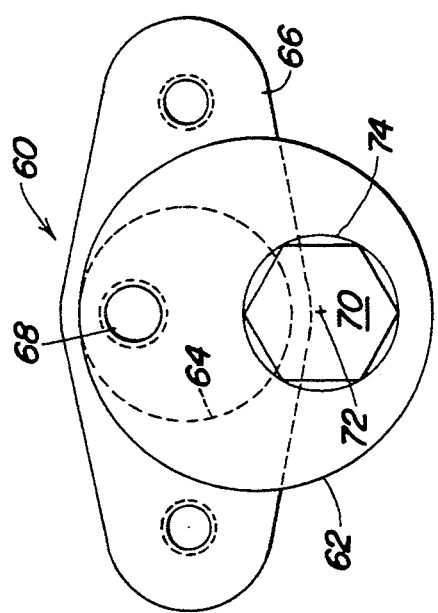
FIG. 5 is a side view of the camming member of the adjustment means.

The adjustment means 34 comprises a camming member 60, best illustrated in FIGS. 5 and 6, having a first circular camming disc 62 and a second circular camming disc 64. The camming member is also provided with a mounting plate 66, a lock bolt aperture 68 and a hex nut stud 70.

The first circular camming disc 62 is larger than the second circular camming disc 64. The first circular camming disc 62 engages oval aperture 52 of first beater grate 28. The second circular camming disc 64 engages the U-shaped slot 56 of the second beater grate 30.

Although there is only one shown, the adjustment means 34 comprises two camming members 60 one on each side of the combine. The hex nut stud 70 is provided with rotation axis 72 and a cylindrical shaft 74. The camming discs 62 and 64 are located inside the sidesheets 46. The cylindrical shaft 74 and the hex nut stud 70 project through an aperture formed in the sidesheets. The rotation axis 72 of the hex nut stud 70 is the rotation axis of the camming member.

FIG. 2 shows the adjustment means and grates in their upper position, and FIG. 3 shows the adjustment means and grates in their lower position. The assembly is locked in these positions by locking bolt 80 which passes through an upper or lower locking aperture in the sidesheets 46 and engages locking aperture 68 located in the camming member.

Figure 7:
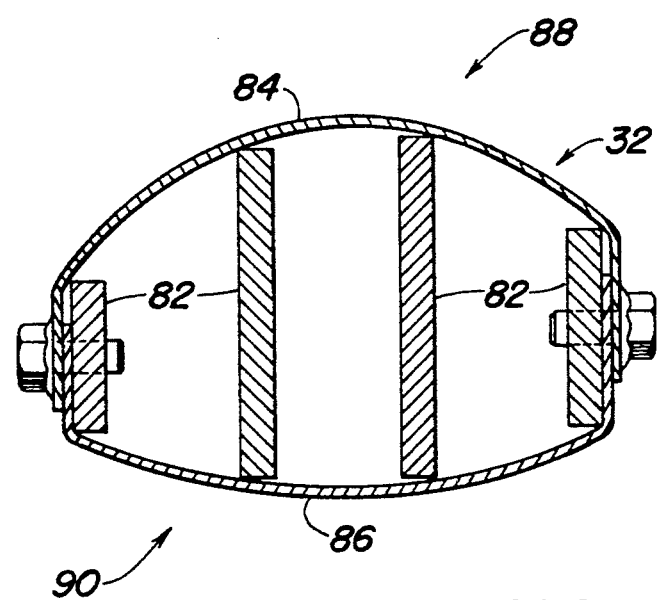
FIG. 7 is a cross sectional view taken along line 7—7 of FIG. 4 of the intermediate transition grate with cover members making it a closed grate.

The intermediate transition grate 32 is best illustrated in FIGS. 4 and 7. Normally the grate would be open as illustrated in FIG. 4, however in tough conditions the grate maybe closed as illustrated in FIG. 7. To close the transition grate cover members 84 and 86 are bolted thereto. The cross bars 82 provide a support backing for the cover members 84 and 86. The transition grate 32 has two profiles a radial aggressive profile 88 and a tangential less aggressive profile 90. The transition grate is bolted to the mounting plate 66 by bolts 92.

To move the assembly from its upper position to a lower position, the operator first removes the locking bolts 80 located on both sidesheets. The operator then places a wrench on the hex nut stud and rotates the camming member 180°. As the camming member is rotated both grates are lowered and the intermediate transition grate rotated 180° from its radial aggressive profile to its tangential less aggressive profile. The operator then locks the camming member in place by inserting the locking bolts 80 through the lower locking aperture in the sidesheets engaging the locking aperture in the camming member.

The invention should not be limited by the above-described embodiments, but should be limited solely by the claims that follow.

I claim:

1. An agricultural combine, comprising:
    a supporting structure;
    ground engaging means extending from the supporting structure for transporting the supporting structure across a field;
    a threshing cylinder and concave for threshing a harvested crop;
    a separator system for separating grain from a threshed crop;
    a cleaning system for cleaning chaff from grain;
    a first beater located adjacent to the threshing cylinder;
    a second beater located between the first transverse beater and the separator system;
    a first beater grate located beneath the first beater adjacent to the concave;
    a second beater grate located beneath the second beater adjacent to the first beater grate;
    an intermediate transition grate located between the first and second beater grates; and
    adjustment means for adjusting the position of the first and second beater grates relative to the first and second beaters.

2. An agricultural combine as defined by claim 1 wherein the position of the intermediate transition grate is adjusted relative to the first and second beaters by the adjustment means.

3. An agricultural combine as defined by claim 2 wherein the first beater grate has a first axial end and a second axial end, the first axial end is pivotally coupled to the concave, the second axial end is coupled to the adjustment means.

4. An agricultural combine as defined by claim 2 wherein the second beater grate has a first axial end and a second axial end, the first axial end is coupled to the adjustment means, the second axial end is pivotally coupled to the supporting structure.

5. An agricultural combine as defined by claim 3 wherein the second beater grate has a first axial end and a second axial end, the first axial end is coupled to the adjustment means, the second axial end is pivotally coupled to the supporting structure.

6. An agricultural combine as defined by claim 5 wherein the adjustment means is a camming member that contacts the second axial end of the first beater grate and the first axial end of the second beater grate for adjusting the first and second beater grates relative to the first and second beaters.

7. An agricultural combine as defined by claim 6 wherein the intermediate transition grate is provided with a cover member.

8. An agricultural combine as defined by claim 7 wherein the intermediate transition grate is mounted to the camming member and rotates with the camming member.

9. An agricultural combine as defined by claim 8 wherein the camming member has two positions, an upper position wherein the beater grates are positioned closer to the first and second beaters, and a lower position wherein the beater grates are positioned further away from the first and second beaters.

10. An agricultural combine as defined by claim 9 wherein the intermediate transition grate has a radial aggressive profile and a tangential less aggressive profile, when the camming member is in its upper position the radial aggressive profile contacts crop material passing under the first and second beaters, when the camming member is in its lower position the tangential less aggressive profile contacts crop material passing under the beaters.

11. An agricultural combine as defined by claim 10 wherein the camming member is shifted from its upper position to its lower position by rotating the camming member 180°.

12. An agricultural combine as defined by claim 11 wherein the camming member is provided with a first circular camming disc and a second circular camming disc, the first camming disc is larger than the second camming disc.

13. An agricultural combine as defined by claim 12 wherein the axial second end of the first beater grate is provided with a rail, the rail is provided with an oval aperture that engages the first camming disc.

14. An agricultural combine as defined by claim 12 wherein the axial first end of the second beater grate is provided with a rail, the rail is provided with a U-shaped slot that engages the second camming disc.

15. An agricultural combine as defined by claim 13 wherein the axial first end of the second beater grate is provided with a rail, the rail is provided with a U-shaped slot that engages the second camming disc.

16. An agricultural combine as defined by claim 15 wherein the camming member is provided with a mounting plate that is mounted to the intermediate transition grate so that the intermediate transition grate rotates with the camming member.

17. An agricultural combine as defined by claim 16 wherein the camming member is provided with a locking bolt aperture which cooperates with a locking bolt passing through a locking aperture in the supporting structure to lock the adjustment means in its upper or lower position.

* * * * *